US012565938B2

(12) United States Patent
Ogawa et al.

(10) Patent No.: US 12,565,938 B2
(45) Date of Patent: Mar. 3, 2026

(54) SWITCHING VALVE

(71) Applicant: EAGLE INDUSTRY CO., LTD.,
Tokyo (JP)

(72) Inventors: Noriyuki Ogawa, Tokyo (JP); Hideki Higashidozono, Tokyo (JP); Naoki Murata, Tokyo (JP); Takayuki Kondo, Tokyo (JP); Ryota Urakawa, Tokyo (JP); Fuminobu Enokijima, Aichi (JP)

(73) Assignee: EAGLE INDUSTRY CO., LTD.,
Tokyo (JP)

( * ) Notice: Subject to any disclaimer, the term of this patent is extended or adjusted under 35 U.S.C. 154(b) by 0 days.

(21) Appl. No.: 18/277,052

(22) PCT Filed: Jan. 25, 2022

(86) PCT No.: PCT/JP2022/002660
§ 371 (c)(1),
(2) Date: Aug. 11, 2023

(87) PCT Pub. No.: WO2022/172743
PCT Pub. Date: Aug. 18, 2022

(65) Prior Publication Data
US 2024/0125398 A1 Apr. 18, 2024

(30) Foreign Application Priority Data
Feb. 15, 2021 (JP) ................................. 2021-022100

(51) Int. Cl.
*F16K 11/07* (2006.01)
*F16K 3/16* (2006.01)
(Continued)

(52) U.S. Cl.
CPC ............ *F16K 11/0743* (2013.01); *F16K 3/16* (2013.01); *F16K 3/314* (2013.01)

(58) Field of Classification Search
CPC .... F16K 11/0743; F16K 11/076; F16K 3/314; F16K 3/16; F16K 3/18
See application file for complete search history.

(56) References Cited

U.S. PATENT DOCUMENTS

| | | | | | |
|---|---|---|---|---|---|
| 2,209,992 | A | * | 8/1940 | Mcgill | ...................... F16K 3/10 137/625.29 |
| 2004/0094216 | A1 | * | 5/2004 | Wagner | ................ B01D 53/047 137/625.46 |

(Continued)

FOREIGN PATENT DOCUMENTS

| | | | |
|---|---|---|---|
| EP | 1021670 | 11/2007 | ............ F16K 11/074 |
| JP | H3114681 | 11/1991 | ............. F16K 31/06 |

(Continued)

OTHER PUBLICATIONS

International Preliminary Report on Patentability issued in PCT/JP2022/002660, dated Aug. 15, 2023, 5 pages.

(Continued)

*Primary Examiner* — Kelsey E Cary
(74) *Attorney, Agent, or Firm* — HAYES SOLOWAY P.C.

(57) ABSTRACT

Disclosed is a switching valve having a small contact resistance when a valve body moves along a seating surface of a housing. In a switching valve which includes a valve body, coming into contact with a seating surface of a housing having a plurality of ports and selectively communicating at least two ports of the plurality of ports, and applies a fluid pressure to a back surface of the valve body, the switching valve includes a biasing member configured for biasing the valve body in a direction in which the valve body is moved away from the seating surface of the housing.

11 Claims, 9 Drawing Sheets

(51) Int. Cl.
  F16K 3/314   (2006.01)
  F16K 11/074   (2006.01)

(56)       References Cited

U.S. PATENT DOCUMENTS

| | | | |
|---|---|---|---|
| 2013/0048123 A1* | 2/2013 | Chen ...................... | F16K 35/04 |
| | | | 137/625.15 |
| 2019/0136988 A1 | 5/2019 | Mizuno et al. ..... | F16K 11/0853 |
| 2020/0018415 A1* | 1/2020 | Yokoe .................. | F16K 31/535 |

FOREIGN PATENT DOCUMENTS

| | | | |
|---|---|---|---|
| JP | H979410 | 3/1997 | ............. F16K 31/04 |
| JP | H10281321 | 10/1998 | ............. F16K 31/04 |
| JP | 2004270470 | 9/2004 | ............. F16K 31/04 |
| JP | 2005256853 | 9/2005 | ............ F16K 11/074 |
| JP | 2012037224 | 2/2012 | ............ F16K 11/074 |
| JP | 2018194037 | 12/2018 | ............ F16K 11/074 |
| WO | 2012008148 | 1/2012 | ............ F16K 11/074 |

OTHER PUBLICATIONS

International Search Report and Written Opinion issued in PCT/ JP2022/002660, dated Mar. 22, 2022, with English translation, 13 pages.

* cited by examiner

SWITCHING VALVE

TECHNICAL FIELD

The present invention relates to a switching valve that switches a flow path through which a fluid flows.

BACKGROUND ART

In various industrial fields, a fluid circuit is used in which a fluid supply source, a fluid operating device, and a heat exchanger are connected in a ring by a flow path. In such a fluid circuit, a plurality of functions may be realized by one fluid circuit by providing a switching valve for switching the flow path through which a hydraulic fluid flows.

For example, the switching valve of Patent Citation 1 performs switching of the fluid circuit that constitutes a heat pump that utilizes heat of vaporization and heat of condensation of a heat medium. The heat pump includes a compressor, a first heat exchanger for an outdoor use, an expansion valve serving as pressure reducing means for expanding a heat medium, and a second heat exchanger for an indoor use and the first heat exchanger, the expansion valve, and the second heat exchanger are connected in series. By switching the heat exchangers connected directly below the compressor between the first heat exchanger and the second heat exchanger using the switching valve, a cooling operation and a heating operation are switched.

The switching valve mainly includes a valve body which is rotated by a motor and a housing which has a seating surface coming into contact with the valve body. The valve body is accommodated in a space inside the housing. An introducing opening communicating with an ejection side of the compressor, a deriving opening communicating with a suction side of the compressor, a first opening communicating with the first heat exchanger side, and a second opening communicating with the second heat exchanger side are equally distributed on the seating surface of the housing. A communication groove opening toward the seating surface is formed along the circumferential direction in the contact portion on the front surface side of the valve body that moves along the seating surface of the housing and contacts the seating surface. As the valve body rotates, the communication groove allows the deriving opening and the first opening to communicate with each other and the introducing opening and the second opening communicate with each other through the space inside the housing. Further, as the valve body rotates in the opposite direction, the communication groove allows the deriving opening and the second opening to communicate with each other and the introducing opening and the first opening communicate with each other through the space inside the housing.

CITATION LIST

Patent Literature

Patent Citation 1: Microfilm of JP H2-22088 U (JP H3-114681 U) (Pages 7 to 11, FIG. 1)

SUMMARY OF INVENTION

Technical Problem

In the switching valve of Patent Citation 1, when using the heat pump in the heating or cooling operation, the pressure of the ejection side heat medium supplied to the space of the housing is applied to the back surface side of the valve body and the pressure of the suction side heat medium supplied to the communication groove, that is, the heat medium depressurized by the expansion valve is applied to the contact portion side of the valve body. Since the pressure of the heat medium supplied to the space of the housing is higher than the pressure of the heat medium supplied to the communication groove and the valve body is sealed while being pressed against the seating surface, the ejection side heat medium is prevented from directly flowing into the communication groove or the suction port.

However, since the valve body is pressed against the seating surface of the housing due to the own weight of the valve body or the differential pressure of the heat medium applied to the back surface of the valve body and the inner peripheral surface of the communication groove when the valve body is rotated to switch the flow path at the time of switching the heating operation mode and the cooling operation mode, the contact portion of the valve body slides on the seating surface of the housing to cause a contact resistance as the valve body rotates and the contact portion of the valve body and the seating surface of the housing is damaged. As a result, there was a possibility that the heat medium might leak.

The present invention has been made in view of such problems and an object thereof is to provide a switching valve having a small contact resistance when a valve body moves along a seating surface of a housing.

Solution to Problem

In order to solve the foregoing problem, a switching valve according to the present invention is a switching valve comprising: a housing provided with a seating surface and a plurality of ports; and a valve body configured for coming into contact with the seating surface of the housing and selectively communicating at least two ports of the plurality of ports of the housing, wherein a fluid pressure is applied to a back surface of the valve body, and the switching valve further comprises a biasing member configured for biasing the valve body in a direction in which the valve body is moved away from the seating surface of the housing. According to the aforesaid feature of the present invention, since the normal force between the valve body and the seating surface of the housing becomes small or the normal force becomes zero by the biasing member while the differential pressure of the fluid applied to the front surface side and the back surface side of the valve body is small or the differential pressure is zero, the contact resistance when the valve body moves along the seating surface of the housing by switching the switching valve decreases.

It may be preferable that the switching valve further comprises a rotor, a stator, a rotating shaft of the rotor, and a rotor casing, wherein both end portions of the rotating shaft are journaled, and the valve body is disposed to be axially movable together with the rotating shaft. According to this preferable configuration, it is possible to smoothly move the valve body in the axial direction with a simple structure.

It may be preferable that the switching valve further comprises a spring provided around the rotating shaft as the biasing member. According to this preferable configuration, it is possible to accurately move the valve body in the axial direction.

It may be preferable that the housing is provided with a bottomed opening portion in which at least part of an end portion of the rotating shaft and the biasing member are arranged. According to this preferable configuration, since it is possible to shorten the distance between the valve body and the seating surface of the housing when at least part of the biasing member is disposed in the bottomed opening portion, it is possible to reduce the influence of the fluid pressure between the valve body and the seating surface of the housing.

It may be preferable that the valve body is provided with a bottomed opening portion into which at least part of end portion of the rotating shaft and the biasing member are inserted. According to this preferable configuration, since it is possible to shorten the distance between the valve body and the seating surface of the housing when at least a part of the biasing member is disposed in the bottomed opening portion, it is possible to reduce the influence of the fluid pressure between the valve body and the seating surface of the housing.

It may be preferable that a communication path is formed to axially communicate with at least one of the rotor, the rotating shaft, and the rotor casing. According to this preferable configuration, since the fluid passes through the communication path in accordance with the axial movement of the valve body, the rotor, and the rotating shaft at the time of switching the switching valve, it is possible to smoothly and reliably separate the valve body from the seating surface of the housing while the fluid resistance is small.

It may be preferable that the valve body has a sealing material that selectively surrounds at least two ports of the plurality of ports provided in the seating surface of the housing. According to this preferable configuration, since the biasing member reduces the normal force between the valve body and the seating surface of the housing, the sealing material is prevented from being bitten by the edge of the port when the valve body moves in parallel to the seating surface of the housing. Therefore, it is possible to maintain high sealing performance by the sealing material.

It may be preferable that the housing is provided with a space which accommodates the valve body and receives a fluid supplied from an introducing port in included in the plurality of ports. According to this preferable configuration, since a high pressure of the fluid supplied from the introducing port to the space is applied to the back surface side of the valve body, it is possible to reliably press the valve body against the seating surface of the housing.

4

Figure 8:
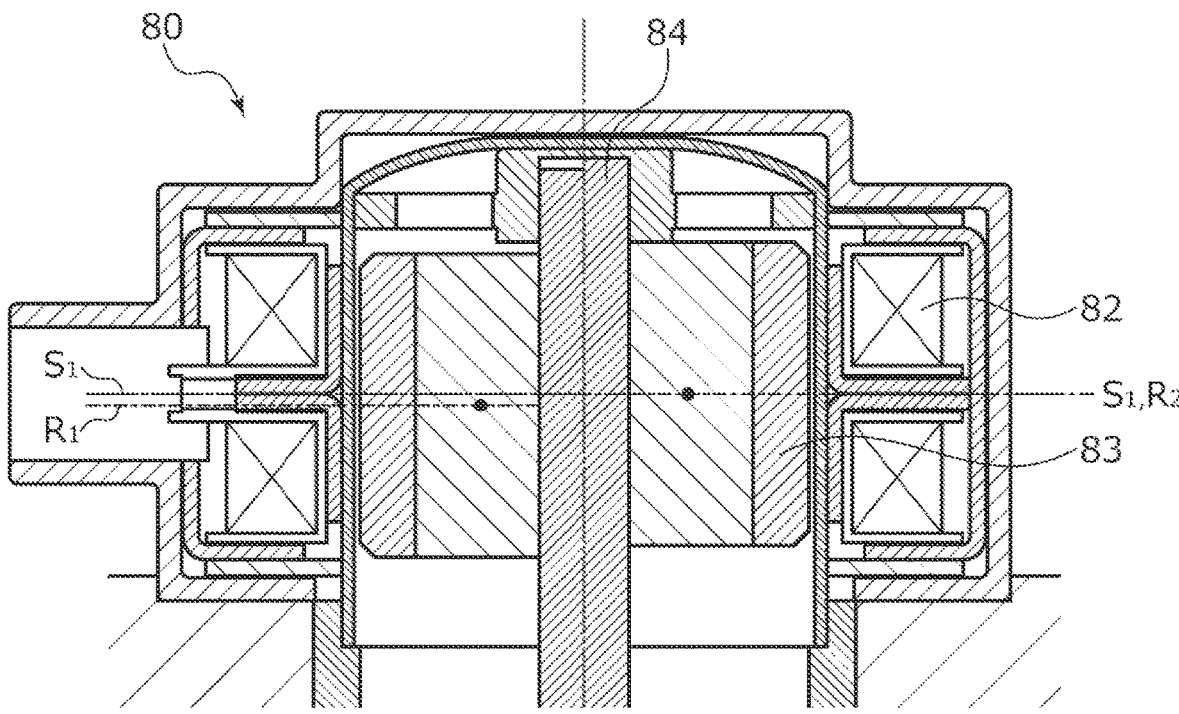

FIG. 8 is a cross-sectional view illustrating a main part of a third modified example of the switching valve of the first embodiment.

FIG. 9 is side cross-sectional views of a switching valve according to a second embodiment of the present invention.

DESCRIPTION OF EMBODIMENTS

Modes for implementing a switching valve according to the present invention will be described below based on embodiments.

First Embodiment

A switching valve according to a first embodiment of the present invention will be described with reference to FIGS. 1 to 5. Hereinafter, the upper and lower sides of FIG. 2 will be described as the upper and lower sides of the switching valve. Specifically, a description will be made on the assumption that the upper side of the paper where a stepping motor 80 is disposed is the upper side of the switching valve, and the lower side of the paper where a housing is disposed is the lower side of the switching valve. Further, in the present invention, the upper side of a valve body is defined as the back surface side, and the lower side thereof is defined as the front surface side.

Figure 1:
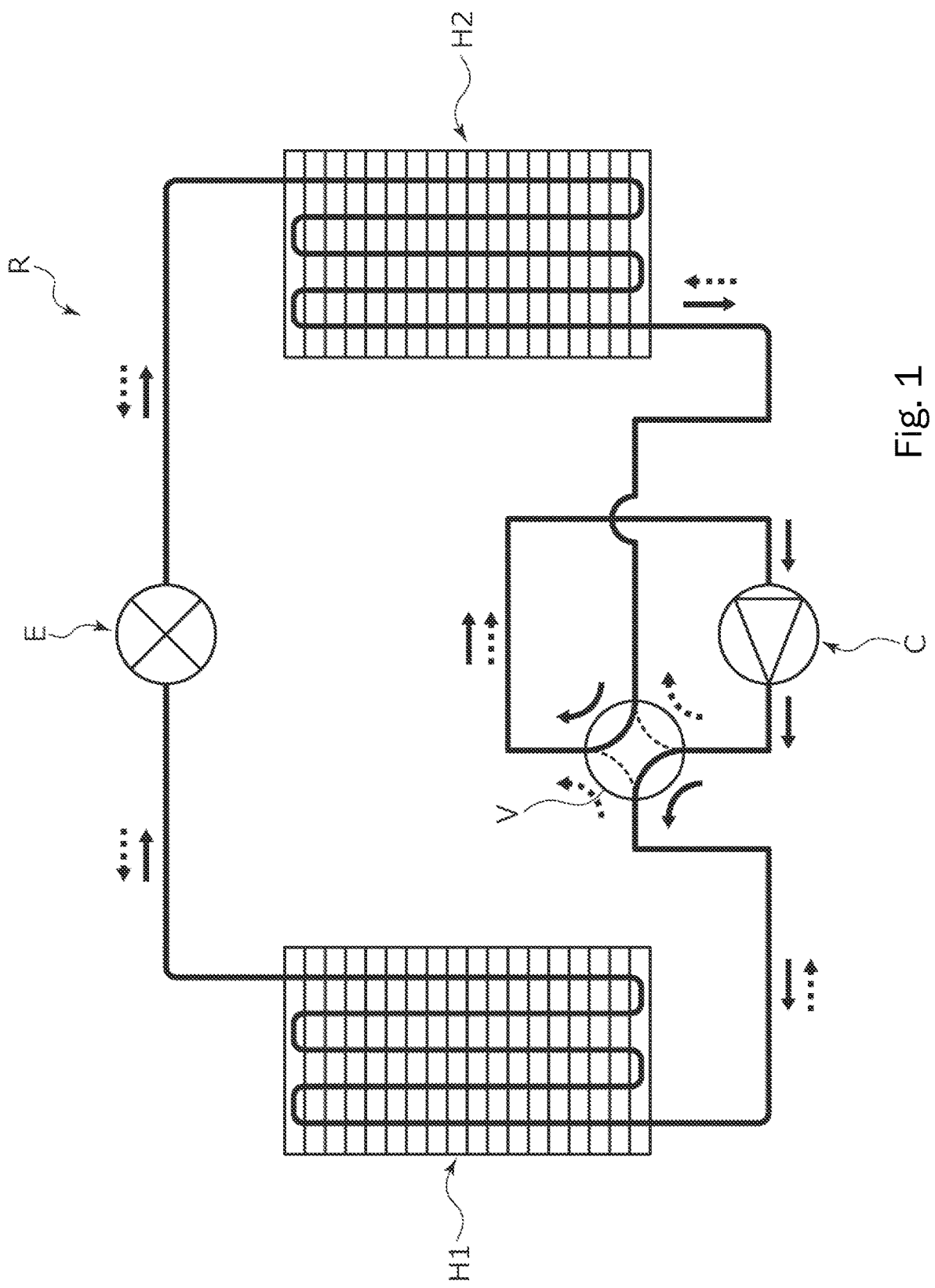
FIG. 1 is a schematic view illustrating a heat pump that employs a switching valve according to a first embodiment of the present invention.

As illustrated in FIG. 1, a switching valve V according to the first embodiment of the present invention constitutes a heat pump R that supplies cold air and warm air in an automobile or the like together with a compressor C, a first heat exchanger H1, an expansion valve E, a second heat exchanger H2, and the like.

First, the heat pump R will be described. As illustrated in FIG. 1, the switching valve V switches the flow path on the downstream side of the compressor C in the fluid circuit of the heat pump R so that the heat medium flows in order of the first heat exchanger H1, the expansion valve E, and the second heat exchanger H2 as indicated by the solid line in FIG. 1 in the cooling operation mode that supplies cold air and switches the flow path so that the refrigerant flows in order of the second heat exchanger H2, the expansion valve E, and the first heat exchanger H1 as indicated by the dotted line in FIG. 1 in the heating operation mode that supplies warm air. Accordingly, in the cooling operation mode, a first heat exchanger H1 becomes a condenser and a second heat exchanger H2 becomes an evaporator. Then, in the heating operation mode, the second heat exchanger H2 becomes a condenser and the first heat exchanger H1 becomes an evaporator.

Next, the structure of the switching valve V will be described with reference to FIGS. 2 to 4. The switching valve V is an electric motor type rotary valve which mainly includes a housing 10 formed of a metal material or a resin material, a valve body 50 disposed inside the housing 10, a stepping motor 80 fixed to the housing 10 and driving the valve body 50, and a coiled wave spring 90 serving as a biasing member. Further, the switching valve V is a so-called four-way valve to which four flow paths are connected.

Figure 2:
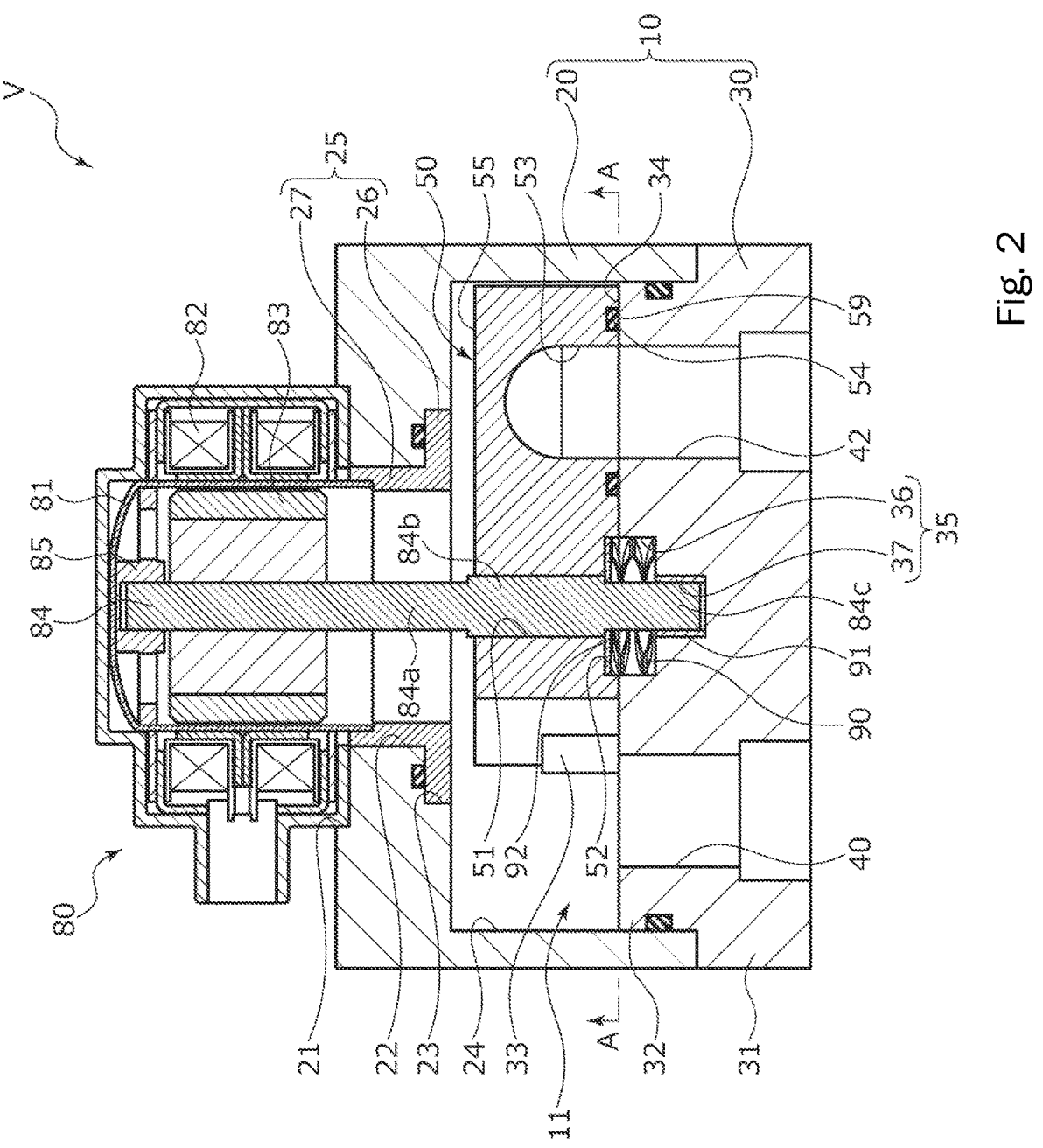
FIG. 2 is a side cross-sectional view of the switching valve of the first embodiment when a valve body is stopped in one switching state.
Figure 3:
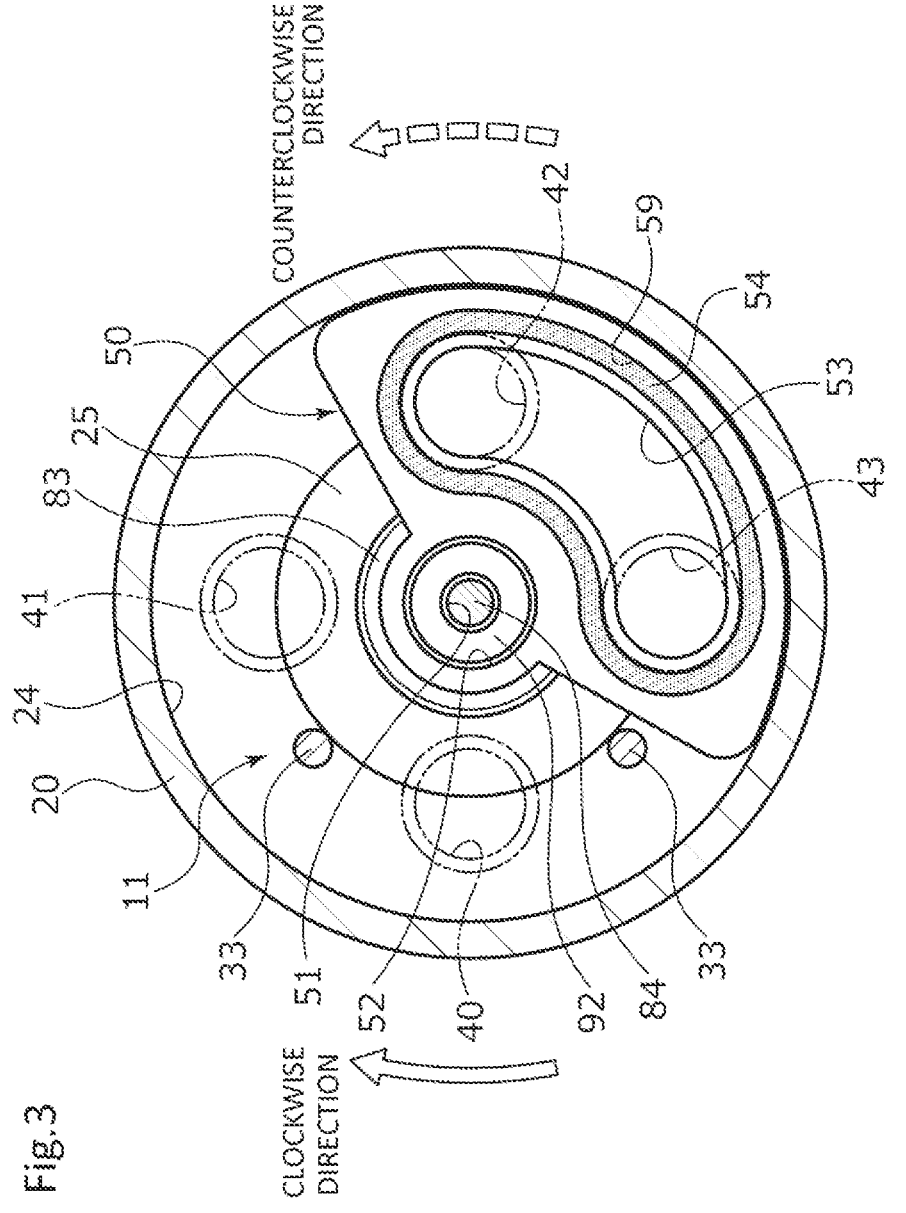
FIG. 3 is a view illustrating one switching state of the switching valve when viewed from the line A-A of FIG. 2.
Figure 4:
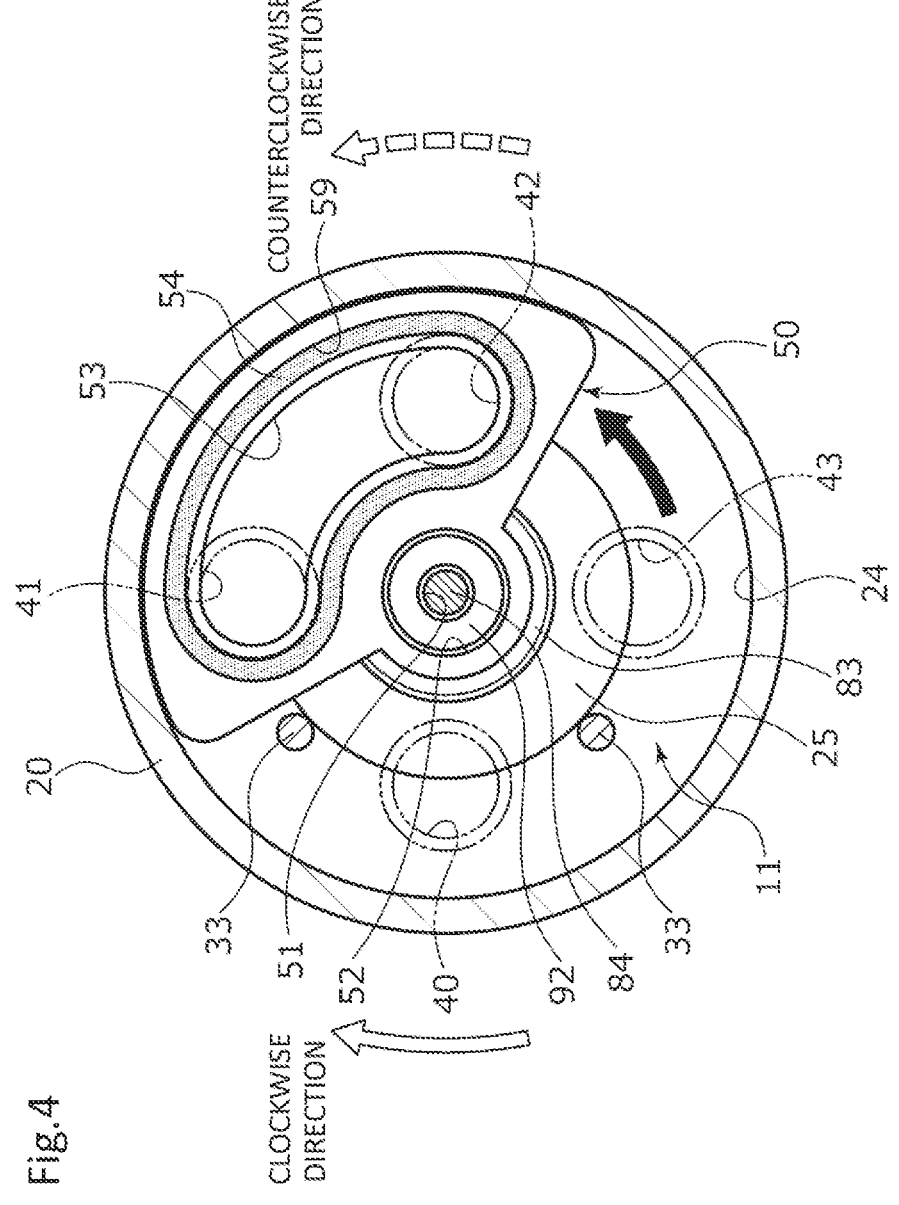
FIG. 4 is a view illustrating another switching state of the switching valve when viewed from the line A-A of FIG. 2.

Additionally, in FIGS. 3 and 4, for convenience of description, four ports 40 to 43 connected to four flow paths not illustrated in the line A-A of FIG. 2 are indicated by the two-dotted chain line, but the coiled wave spring 90 is not illustrated.

The housing 10 includes an inner diameter side stepped cylindrical cover body 20 and an outer diameter side stepped disk-shaped bottom body 30.

In order from the upper side in the axial direction, the cover body 20 is provided with an opening portion 21 which opens axially upward and has a stepped cross-section, a small-diameter through portion 22 which is continuous to the opening portion 21 and has a diameter smaller than that of the opening portion 21, a medium-diameter through portion 23 which is continuous to the small-diameter through portion 22, has a diameter larger than that of the small-diameter through portion 22, and has a stepped cross-section, and a large-diameter through portion 24 which is continuous to the medium-diameter through portion 23 and has a diameter larger than that of the medium-diameter through portion 23. The opening portion 21, the small-diameter through portion 22, the medium-diameter through portion 23, and the large-diameter through portion 24 penetrate the cover body 20 in the axial direction.

Further, a tubular body 25 which is formed in an outer radial flange attached cylindrical shape is inserted and disposed in the small-diameter through portion 22 and the medium-diameter through portion 23 of the cover body 20 from the lower side to the upper side in the axial direction while an O-ring is interposed between an upper end surface of a flange portion 26 of the tubular body 25 and a bottom surface of the medium-diameter through portion 23 (in other words, the upper surface of FIG. 2). A can 81 of a stepping motor 80 to be described later is fixed to a cylindrical portion 27 of the tubular body 25 using a fixing member (not illustrated) and a casing accommodating the can 81, a stator 82, and the like of the stepping motor 80 is fixed to the cover body 20 using a fixing member (not illustrated).

In order from the upper side in the axial direction, the bottom body 30 is provided with a columnar portion 32 and a flange portion 31 extending radially outward from the columnar portion 32 and the columnar portion 32 is press-inserted and fixed to the lower end portion of the large-diameter through portion 24 of the cover body 20 while an O-ring is interposed between the inner peripheral surface of the large-diameter through portion 24 and the outer peripheral surface of the columnar portion 32 and constitutes the housing 10 together with the cover body 20.

Further, as illustrated in FIGS. 3 and 4, four ports 40 to 43 which are a plurality of ports penetrating in the axial direction are equally distributed in the bottom body 30.

More specifically, the arrangement order of the ports 40 to 43 is set as below. That is, the introducing port 40 communicating with the ejection side of the compressor C is formed between the compressor C and the first heat exchanger H1 side, the first port 41 communicating with the first heat exchanger H1 is formed between the compressor C and the first heat exchanger H1, the deriving port 42 communicating with the suction side of the compressor C is formed between the compressor C and the second heat exchanger H2, and the second port 43 communicating with the second heat exchanger H2 side is formed between the compressor C and the second heat exchanger H2 in the clockwise order indicated by the solid white arrow in FIG. 3 from the port 40 located at 9 o'clock on the assumption that the upper side is 12 o'clock in the same figure.

Additionally, in FIGS. 3 and 4, the clockwise direction indicated by the white solid arrow and the counterclockwise direction indicated by the white dotted arrow are the rotation directions of the valve body 50 by the stepping motor 80.

In the bottom body 30, a pin-shaped restricting portion 33 is fixed to each of a position between the introducing port 40 and the first port 41 and a position between the deriving port 42 and the second port 43 to extend upward from an upper end surface 34 of the columnar portion 32 serving as a seating surface of the housing.

Further, as illustrated in FIG. 2, a concave portion 35 serving as a bottomed opening portion and having a stepped cross-section is formed at the center of the bottom body 30 in the radial direction. Specifically, in order from the upper side in the axial direction, a large-diameter hole portion 36 which opens axially upward and has a stepped cross-section and a small-diameter concave portion 37 which is continuous to the large-diameter hole portion 36, has a diameter smaller than that of the large-diameter hole portion 36, and has a concave cross-section are provided.

As illustrated in FIGS. 3 and 4, the valve body 50 is formed in a plate shape having a substantially fan shape (such a shape of circular sector) in the plan view and is accommodated between two restricting portions 33 and on the side of the deriving port 42 in the circumferential direction while the radius is slightly smaller than the radius of the inner surface of the large-diameter through portion 24 of the housing 10.

As illustrated in FIG. 2, the valve body 50 is provided with a small-diameter through portion 51 which has a small diameter and a large-diameter through portion 52 which is a bottomed opening portion continuous to the lower end of the small-diameter through portion 51, having a diameter larger than that of the small-diameter through portion 51, and having a stepped cross-section. The small-diameter through portion 51 and the large-diameter through portion 52 penetrate the valve body 50 in the axial direction.

Further, the inner diameter of the large-diameter through portion 52 is substantially the same as the inner diameter of the large-diameter hole portion 36 of the bottom body 30.

Further, as illustrated in FIGS. 2 to 4, the valve body 50 is provided with a communication groove 53 which is recessed axially upward from the axial lower end surface and has a cannonball-shaped cross-section when viewed from the radial direction (see FIG. 2) and a substantially quarter-arc shape along the circumferential direction when viewed from the axial direction (see FIGS. 3 and 4).

More specifically, the communication groove 53 is disposed and formed to allow the communication of the ports 42 and 43 when the valve body 50 is rotated in the clockwise direction in FIGS. 3 and 4 and to allow the communication of the ports 41 and 42 when the valve body 50 is rotated in the counterclockwise direction in FIGS. 3 and 4.

In the valve body 50, an O-ring 54 which is a sealing material is inserted and fixed to a groove 59 which is recessed axially upward from the axial lower end surface along the peripheral edge of the communication groove 53 and has both base angles set as right angles in a cross-sectional view (see FIG. 2) and an endless annular shape in a bottom view (see FIGS. 3 and 4).

As illustrated in FIG. 2, the stepping motor 80 mainly includes the bottomed cylindrical can 81 which serves as a rotor casing, the stator 82 which is disposed on the outer radial side of the can 81 and has a coil, a rotor 83 which is disposed on the inner radial side of the can 81 and has a plurality of permanent magnets fixed to the outer periphery of the base member, a rotating shaft 84 which is inserted and fixed to the rotor 83, and a bearing 85 which is disposed and fixed to the bottom portion of the can 81.

The stepping motor 80 is fixed to the housing 10 in such a manner that the lower end portion of the can 81 is fitted into the upper end portion of the cylindrical portion 27 of the tubular body 25 and a casing accommodating the can 81, the stator 82, and the like of the stepping motor 80 is fixed to the cover body 20 using a fixing member (not illustrated). In addition, the stepping motor 80 may be fixed to the housing 10 in such a manner that the can 81 is fixed to the cylindrical portion 27 of the tubular body 25 and the fixing method may be appropriately changed.

The rotating shaft 84 is formed in a stepped columnar shape and an upper thin portion 84*a*, a thick portion 84*b* which is continuous to the lower end of the upper thin portion 84*a* and is thicker than the upper thin portion 84*a*, and a lower thin portion 84*c* which is continuous to the lower end of the thick portion 84*b* and is thinner than the thick portion 84*b* are formed in order from the upper side in the axial direction.

The upper thin portion 84*a* of the rotating shaft 84 is inserted into the bearing 85 to be rotatable and movable in the up and down direction while the outer diameter is slightly smaller than the inner diameter of the bearing 85.

Further, the upper thin portion 84*a* is press-inserted into the through-hole of the rotor 83 and is fixed to the rotor 83.

The thick portion 84*b* of the rotating shaft 84 is press-inserted into the small-diameter through portion 51 and is fixed to the valve body 50 while the outer diameter is slightly larger than or substantially the same as the inner diameter of the small-diameter through portion 51 of the valve body 50.

Further, the lower thin portion 84*c* of the rotating shaft 84 is formed to have a diameter smaller than the inner diameter of a bearing 91 fixed to the small-diameter concave portion 37 of the bottom body 30 and is inserted into the bearing 91 to be rotatable and movable in the up and down direction.

In this way, the valve body 50, the rotor 83, and the rotating shaft 84 are integrally fixed and are rotatable in the same direction or movable in the axial direction.

Further, the lower thin portion 84*c* passes through the coiled wave spring 90 and an annular thin plate 92 in order from the axial lower side.

The coiled wave spring 90 biases the valve body 50 axially upward through the annular thin plate 92 in such a manner that the upper end contacts the lower end surface of the annular thin plate 92 and the lower end contacts the bottom surface of the large-diameter hole portion 36 (in other words, the lower surface of FIG. 2).

The annular thin plate 92 is formed of a low-friction material such as PTFE (polytetrafluoroethylene) and fixed to the large-diameter through portion 52.

Further, since the upper end surface of the annular thin plate 92 comes into surface contact with the lower end surface of the thick portion 84*b* of the rotating shaft 84 and the bottom surface of the large-diameter through portion 52 of the valve body 50 substantially flush with the lower end surface, the biasing force of the coiled wave spring 90 is transmitted to both the valve body 50 and the rotating shaft 84.

Further, the annular thin plate 92 is formed of a low-friction material and the rotation of the valve body 50 and the rotating shaft 84 is not easily transmitted to the coiled wave spring 90. Accordingly, since friction is less likely to occur between the valve body 50, the rotating shaft 84, and the coiled wave spring 90 during the rotation of the valve body 50, the driving force required for rotation is reduced and wear of the valve body 50, the rotating shaft 84, and the coiled wave spring 90 is suppressed.

In addition, the annular thin plate 92 may be omitted, but in order to reduce the friction between the valve body 50, the rotating shaft 84, and the coiled wave spring 90, it is preferable to take low-friction means for interposing a coating layer of a low-friction material or a bearing between the valve body 50, the rotating shaft 84, and the coiled wave spring 90.

Further, a back pressure chamber 11 is defined inside the housing 10 by the cover body 20, the tubular body 25, the upper end surface 34 of the bottom body 30, the valve body 50, and the can 81 as a space to which a fluid is supplied from the introducing port.

As described above, the valve body 50 is disposed between two restricting portions 33 and the movement toward the introducing port 40 is restricted. In other words, the introducing port 40 always communicates with the back pressure chamber 11 and a high-pressure heat medium ejected from the compressor C is introduced thereinto at the time of driving the compressor C.

Accordingly, in the valve body 50, the pressure of the heat medium ejected from the compressor C and applied to the upper end surface 55 as the back surface of the valve body 50 in the back pressure chamber 11 is higher than the pressure of the heat medium depressurized by the expansion valve E and applied to the inner peripheral surface of the communication groove 53 as the front surface of the valve body 50 in the use state of the heat pump in which the compressor C is driven.

The force of pressing the valve body 50 against the upper end surface 34 of the bottom body 30 by the heat medium of the back pressure chamber 11 exceeds the sum of the force of separating the valve body 50 from the upper end surface 34 of the bottom body 30 by the heat medium of the communication groove 53 and the force of separating the valve body 50 from the upper end surface 34 of the bottom body 30 by the coiled wave spring 90.

Therefore, since the valve body 50, specifically, the O-ring 54 is pressed against and sealed by the upper end surface 34 of the bottom body 30 as illustrated in FIG. 2, the heat medium ejected from the compressor C is prevented from directly flowing into the communication groove 53 or the deriving port 42.

Next, the switching of the flow path of the fluid circuit by the switching valve V will be described with reference to FIGS. 3 to 5. In this description, the switching of the communication state of the ports 42 and 43 by the communication groove 53 of the valve body 50 illustrated in FIG. 3 and the communication state of the ports 41 and 42 by the communication groove 53 of the valve body 50 illustrated in FIG. 4 will be described.

In the switching of the flow path of the fluid circuit by the switching valve V, the driving of the compressor C is stopped. In the stop state of the compressor C, since the ejection side heat medium pressure and the suction side heat medium pressure of the compressor C become more uniform as time elapses, the differential pressure of the heat medium between the ejection side and the suction side of the compressor C becomes smaller compared to when the compressor C is driven.

Figure 5:
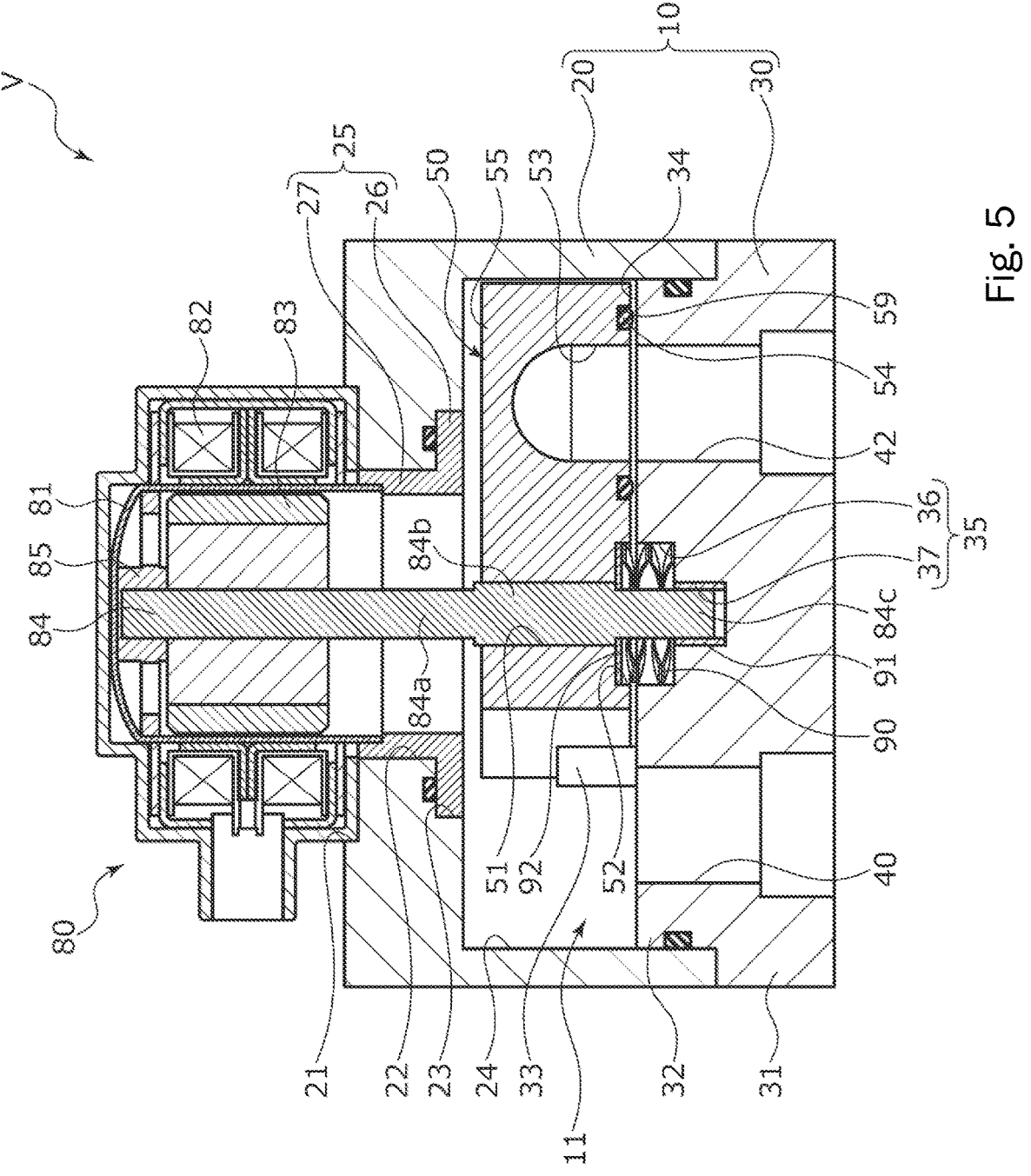
FIG. 5 is a side cross-sectional view of the switching valve of the first embodiment when the valve body rotates in one switching state.

Therefore, the force of pressing the valve body 50 against the upper end surface 34 of the bottom body 30 by the differential pressure of the heat medium between the ejection side and the suction side of the compressor C becomes smaller compared to when the compressor C is driven and the valve body 50 is moved axially upward by the biasing force of the coiled wave spring 90 to be separated from the upper end surface 34 of the bottom body 30 as illustrated in FIG. 5.

In addition, when the differential pressure is large to some extent, the valve body 50 contacts the upper end surface 34 of the bottom body 30, but the normal force applied from the upper end surface 34 to the valve body 50 becomes smaller compared to when the compressor C is driven. Hereinafter, a case in which the valve body 50 is separated from the upper end surface 34 of the bottom body 30 will be described unless otherwise specified.

At this time, since the rotor 83 and the rotating shaft 84 also move axially upward together with the valve body 50 and both end portions of the rotating shaft 84 are guided in the axial direction by the bearings 85 and 91, it is possible to smoothly move the valve body 50 in the axial direction with a simple structure.

Next, the stepping motor 80 is driven to rotate the rotating shaft 84 and to rotate the valve body 50 in the counterclockwise direction from the state illustrated in FIG. 3 and the stepping motor 80 is stopped while the ports 41 and 42 are aligned to the communication groove 53 of the valve body 50 illustrated in FIG. 4.

Then, when the compressor C is driven, the differential pressure between the ejection side heat medium pressure and the suction side heat medium pressure increases and the valve body 50 is pressed against and sealed by the upper end surface 34 of the bottom body 30 as described above. In this way, the switching valve V can switch the flow path of the fluid circuit in a state in which the ports 41 and 42 communicate with each other while the valve body 50 is separated from the upper end surface 34 of the bottom body 30.

In addition, when the fluid circuit is switched from the state of FIG. 4 to the state of FIG. 3, the switching can be performed by rotating the stepping motor 80 in the opposite direction, rotating the valve body 50 in the clockwise direction, and driving the compressor C.

As described above, in the switching valve V of this embodiment, since the normal force between the valve body 50 and the upper end surface 34 of the housing 10 becomes small or the normal force becomes zero by the coiled wave spring 90 while the differential pressure of the heat medium applied to the upper end surface 55 of the valve body 50 and the inner peripheral surface of the communication groove 53 is small or the differential pressure is zero, the contact resistance when the valve body 50 rotates along the upper end surface 34 of the housing 10 by switching the switching valve V decreases.

Further, since the rotating shaft 84 passes through the coiled wave spring 90 and the expansion and contraction of the coiled wave spring 90 are guided by the rotating shaft 84, it is possible to accurately move the valve body 50 in the axial direction.

Further, since the axial upper end portion of the coiled wave spring 90 is disposed in the large-diameter through portion 52 of the valve body 50, the axial lower end portion thereof is disposed in the large-diameter hole portion 36 of the housing 10, and the distance between the valve body 50 and the upper end surface 34 of the housing 10 can be shortened, it is possible to reduce the influence of the fluid pressure between the valve body 50 and the upper end surface 34 of the housing 10.

Further, since the coiled wave spring 90 is inserted into the large-diameter through portion 52 of the valve body 50 having a diameter slightly larger than the coiled wave spring 90 and the large-diameter hole portion 36 of the housing 10 and the expansion and contraction of the coiled wave spring 90 is guided by the inner peripheral surface of the large-diameter through portion 52 or the large-diameter hole portion 36, it is possible to accurately move the valve body 50 in the axial direction.

Further, since the coiled wave spring 90 reduces the normal force between the valve body 50 and the upper end surface 34 of the housing 10, the O-ring 54 is prevented from being bitten by the edges of the ports 41 to 43 when the valve body 50 rotates. Therefore, it is possible to maintain high sealing performance by the O-ring 54.

In addition, a configuration in which the valve body 50 moves together with the rotor 83 and the rotating shaft 84 has been described, but the present invention is not limited thereto. For example, the valve body and the rotating shaft may move together relative to the rotor or the valve body may move relative to the rotating shaft.

First Modified Example

Figure 6:
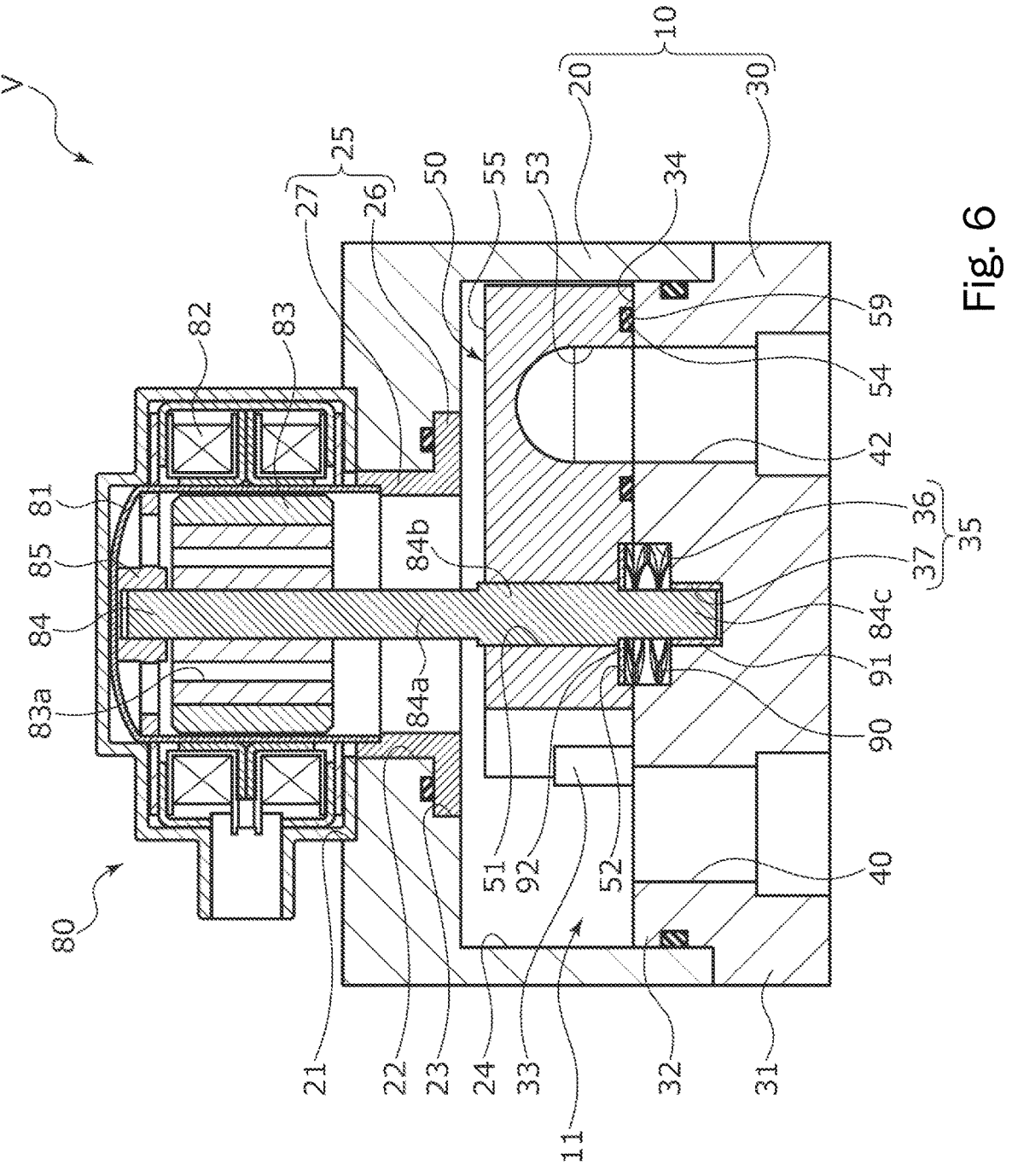
FIG. 6 is a side cross-sectional view illustrating a first modified example of the switching valve of the first embodiment.

Next, a first modified example of the switching valve V will be described with reference to FIG. 6. The switching valve V of the first modified example is different from that of the first embodiment in that a communication path 83a is formed through the base material of the rotor 83 in the axial direction and the other configurations are the same as those of the first embodiment. Accordingly, since a fluid passes through the communication path 83a in accordance with the axial movement of the valve body 50, the rotor 83, and the rotating shaft 84 when switching the switching valve V, the fluid resistance of the rotor 83 is small and the valve body 50 can be smoothly and reliably separated from the upper end surface 34 of the housing 10.

In addition, the communication path is not limited to be formed in the rotor 83 and may be formed in the can 81 or the rotating shaft 84. For example, the communication path may be formed by curving a part of the peripheral wall of the can 81 radially outward. Further, the communication path is not limited to the through-hole and may be formed by notching the outer peripheral surface of the rotor 83 or the rotating shaft 84 radially inward. Although the number of the communication paths is not limited, it is preferable to have a plurality of communication paths from the viewpoint of structural strength and prevention of fluid imbalance.

Second Modified Example

Figure 7:
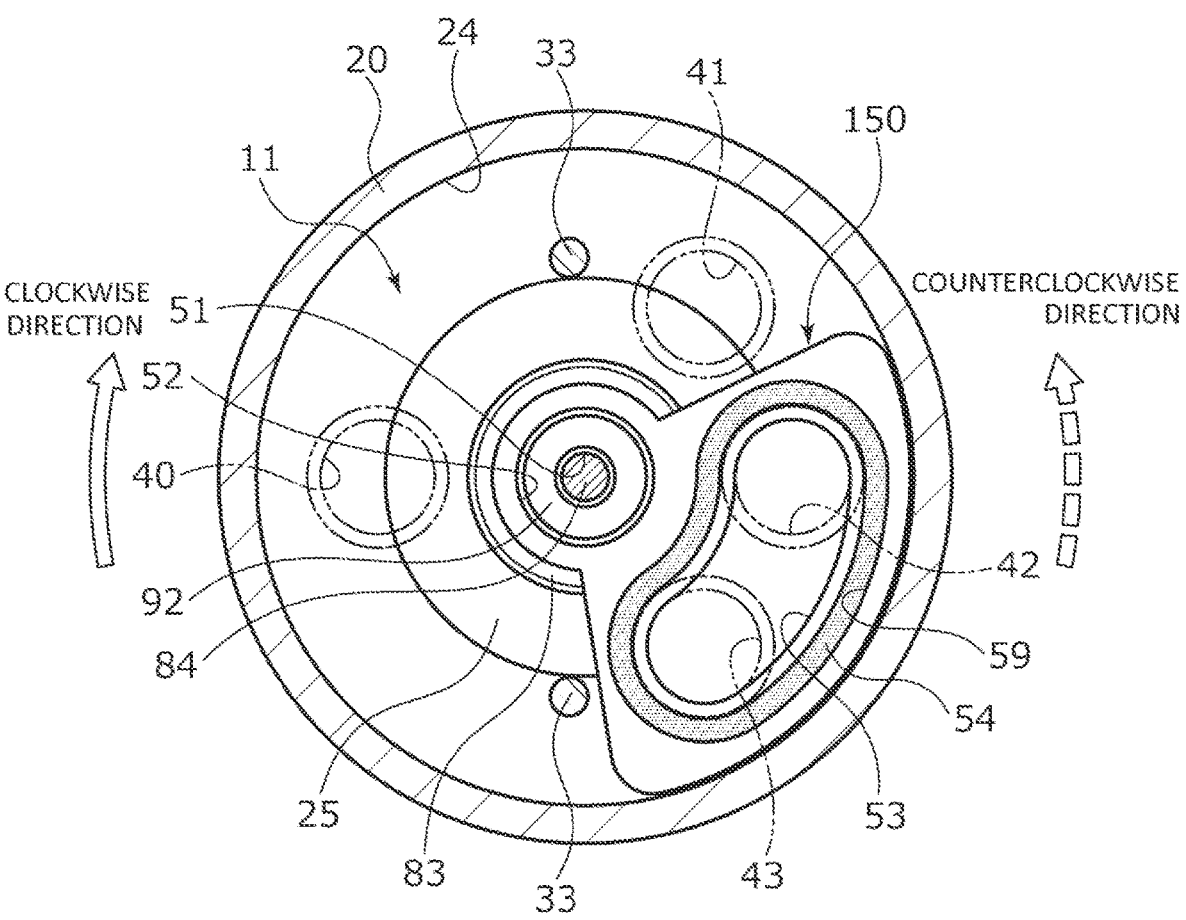
FIG. 7 is a cross-sectional view illustrating a main part of a second modified example of the switching valve of the first embodiment.

Next, a second modified example of the switching valve V will be described with reference to FIG. 7. The switching valve V of the second modified example is different from the first embodiment in that the ports 41 and 43 are arranged in the vicinity of the deriving port 42 and the other configurations are the same as those of the first embodiment. According to such a configuration, since the rotation range of the valve body 150 is narrow within 180° and the length of the communication groove 53 can be shortened, the valve body 150 can be made smaller.

Third Modified Example

Next, a third modified example of the switching valve V will be described with reference to FIG. 8. The switching valve V of the third modified example is different from the first embodiment in that an axial center $R_1$ of the rotor 83 is located below an axial center $S_1$ of the stator 82 as illustrated in the left half of FIG. 8 when the compressor C is driven and the axial center $S_1$ of the stator 82 and the axial center $R_1$ of the rotor 83 are arranged on the same line as illustrated in the right half of FIG. 8 when the valve body 50 is rotated and the other configurations are the same as those of the first embodiment.

According to such a configuration, since the electromagnetic force generated by energizing the stator 82 acts to move the rotor 83 axially upward, it is possible to assist the axial movement of the valve body 50 by the biasing force of the coiled wave spring 90.

In this way, the biasing member is not limited to the coiled wave spring 90, and other biasing means may also be used.

Further, the biasing member may be biasing member which generates an electromagnetic force by energizing the stator 82.

Here, the first to third modified examples do not prevent using some of them in combination.

Second Embodiment

An expansion valve according to a second embodiment of the present invention will be described with reference to FIG. 9. Additionally, the description of the overlapping configuration that is the same as that of the first embodiment is omitted. Further, in this description, the right side of the paper on which a motor 280 is disposed is the right side of the switching valve, and the opposite left side of the paper is the left side of the switching valve.

As illustrated in FIG. 9, in this embodiment, a switching valve V200 mainly includes a housing 210, a valve body 250 disposed inside the housing 210, and the motor 280 and can axially move the valve body 250 in a reciprocating manner by driving the motor 280.

In the housing 210, the upper end portion is provided with an introducing port 240 and the lower end portion is provided with a pipe portion 230 in which a first port 241, a deriving port 242, and a second port 243 are arranged in parallel.

Figure 9A:
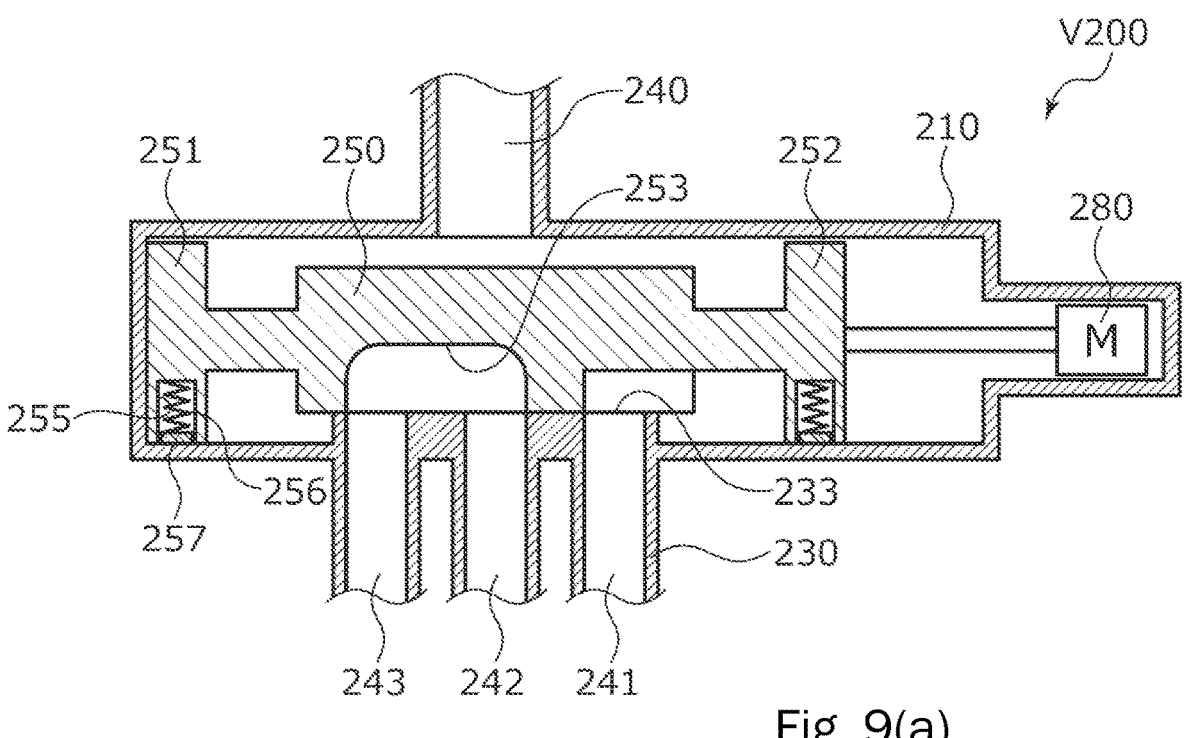

Further, as illustrated in FIG. 9A, an upper end surface 233 of the pipe portion 230 is a seating surface pressing the valve body 250 by the differential pressure when the compressor C is driven.

The valve body 250 is formed in an outer radial stepped columnar shape and a communication groove 253 opening downward is formed in a base portion located at the axial center.

Accordingly, when the valve body 250 is moved toward the left axial side, the communication groove 253 allows the communication between the ports 242 and 243 and the communication between the ports 240 and 241. Further, when the valve body 250 is moved toward the right axial side, the communication groove 253 allows the communication between the ports 241 and 242 and the communication between the ports 240 and 241.

Further, a concave portion 255 which is recessed upward from the lower end surface is formed at thick end portions 251 and 252 having diameters larger than that of the base portion and located at both axial end portions of the valve body 250. A coil spring 256 as a biasing member is inserted into the concave portion 255 and a low-friction member 257 formed of a low-friction material is fixed to the lower end of the coil spring 256.

Figure 9B:
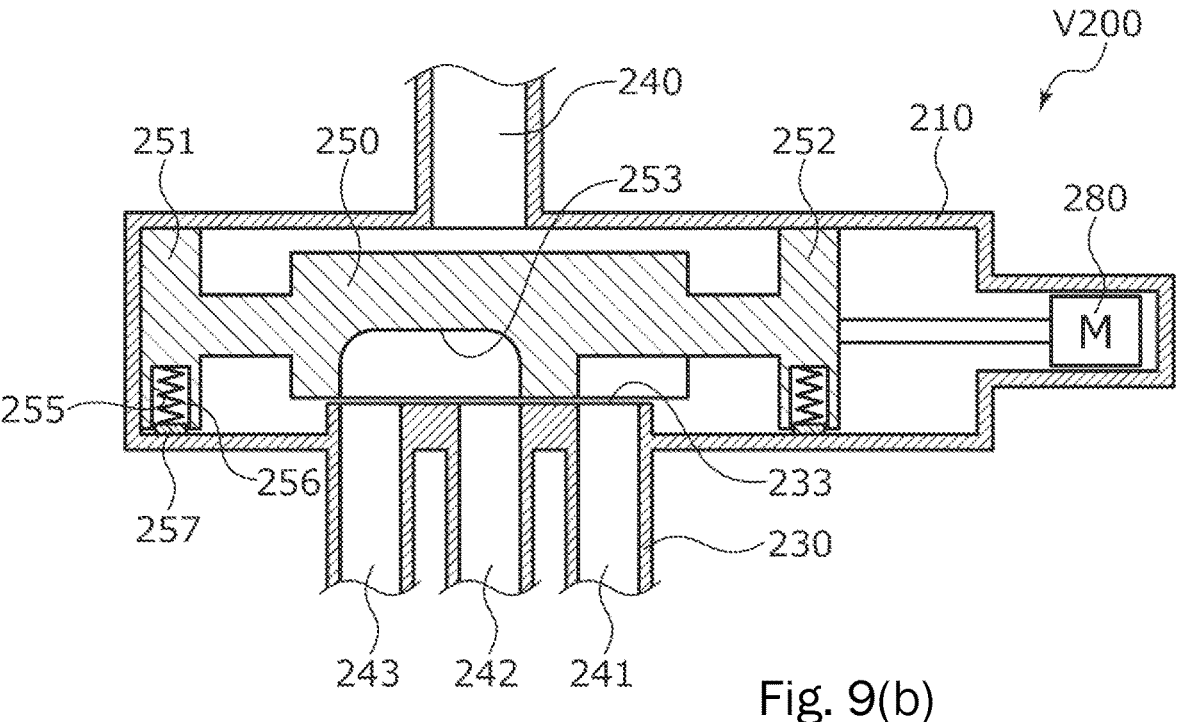

Accordingly, when the flow path of the fluid circuit is switched by the switching valve V200, as illustrated in FIG. 9B, the valve body 250 is separated from the upper end surface 233 of the housing 210 by each coil spring 256 and the normal force applied from the upper end surface 233 to the valve body 250 becomes substantially zero. Accordingly, the valve body 250 can be moved axially by a small driving force and the valve body 250 is less likely to be damaged.

Further, since the low-friction member 257 reduces the friction generated between the coil spring 256 and the inner peripheral surface of the housing 210, the valve body 250 can be smoothly moved.

Although the embodiments of the present invention have been described above with reference to the drawings, the specific configuration is not limited to these examples, and any changes or additions that do not depart from the gist of the present invention are included in the present invention.

For example, in the first and second embodiments, a configuration has been described in which the switching valve is a four-way valve having four ports, but the present invention is not limited thereto. For example, the number of ports may be five or more.

Further, in the first and second embodiments, a configuration has been described in which the communication groove of the valve body selectively communicates two ports, but the present invention is not limited thereto. For example, three or more ports may be selectively communicated with each other. The same applies to the space on the back surface side of the valve body, that is, the back pressure chamber side.

Further, in the first and second embodiments, a configuration has been described in which the valve body is rotated or moved in a reciprocating manner by the motor, but the present invention is not limited thereto. For example, the valve body may be manually rotated or moved in a reciprocating manner and a drive source other than the motor may be used as appropriate.

Further, in the first embodiment, the biasing member has been exemplified as the coiled wave spring, the biasing means configured to generate the electromagnetic force, and the coil spring, but the present invention is not limited thereto. For example, known springs such as disc springs and leaf springs may be used or various cylinders may be used. Anything that can apply a biasing force may be used as appropriate.

Further, in the first and second embodiments, the biasing member has been exemplified as the coiled wave spring and the coil spring separated from the valve body or the housing, but the present invention is not limited thereto. For example, a configuration in which a resilient spring portion is integrally formed by cutting and erecting a part of the valve body or the housing may be employed.

Further, in the first embodiment, a configuration has been described in which the sealing material is the O-ring, but the present invention is not limited thereto. For example, known sealing materials such as an X-shaped packing having an X-shaped cross-section, a Y-shaped packing having a Y-shaped cross-section, and a gasket may be used. Further, the sealing is not limited to the sealing material separated from the valve body, but the sealing may be performed by a bead formed on the lower end surface of the valve body.

Further, in the first embodiment, a configuration has been described in which the O-ring serving as the sealing material is inserted and fixed to the annular groove formed in the valve body, but the present invention is not limited thereto. For example, the O-ring may be welded or adhered to the lower end surface of the valve body and the fixing method may be changed as appropriate.

REFERENCE SIGNS LIST

10 Housing
11 Back pressure chamber (space for receiving fluid from introducing port)
34 Upper end surface (seating surface of housing)
35 Concave portion (bottomed opening portion)
40 Introducing port (port)
41 First port (port)
42 Deriving port (port)

43 Second port (port)
50 Valve body
54 O-ring (sealing material)
55 Upper end surface (back surface)
81 Can (rotor casing)
83 Rotor
83$a$ Communication path
84 Rotating shaft
85 Bearing
90 Coiled wave spring (biasing member)
91 Bearing
150 Valve body
210 Housing
233 Upper end surface (seating surface)
240 Introducing port
241 First port
242 Deriving port
243 Second port
250 Valve body
256 Coil spring (biasing member)
C Compressor
E Expansion valve
H1 First heat exchanger
H2 Second heat exchanger
R Heat pump
R$_1$ Axial center of rotor
S$_1$ Axial center of stator
V Switching valve
V200 Switching valve

The invention claimed is:

1. A switching valve comprising:

a housing provided with a seating surface and a plurality of ports;

a valve body provided to be rotatable with respect to the housing; and configured for coming into contact with the seating surface of the housing and selectively communicating at least two ports of the plurality of ports of the housing; and a rotary driving device configured to rotate the valve body, wherein the rotary driving device includes a rotating shaft, a rotor fixed to the rotating shaft, a rotor casing having the rotor housed therein, and a stator having a coil and disposed on an outer periphery of the rotor casing, both end portions of the rotating shaft are journaled, the valve body is disposed to be axially movable together with the rotating shaft, a fluid pressure is applied to a back surface of the valve body, and the switching valve further comprises a biasing member disposed between the housing and the valve body and configured for biasing the valve body in a direction in which the valve body is moved away from the seating surface of the housing, and the switching valve further comprises an annular thin plate disposed between the valve body and the biasing member and a coiled wave spring provided around the rotating shaft as the biasing member and configured to bias the valve member through the annular thin plate in the axial direction.

2. The switching valve according to claim 1, wherein the housing is provided with a bottomed opening portion in which at least part of an end portion of the rotating shaft and the biasing member are arranged.

3. The switching valve according to claim 2, wherein the valve body is provided with a bottomed opening portion into which at least part of an end portion of the rotating shaft and the biasing member are inserted.

4. The switching valve according to claim 2, wherein a communication path is formed to axially communicate with at least one of the rotor, the rotating shaft, and the rotor casing.

5. The switching valve according to claim 2, wherein the valve body has a sealing material that selectively surrounds at least two ports of the plurality of ports provided in the seating surface of the housing.

6. The switching valve according to claim 2, wherein the housing is provided with a space which accommodates the valve body and receives a fluid supplied from an introducing port included in the plurality of ports.

7. The switching valve according to claim 1, wherein the valve body is provided with a bottomed opening portion into which at least part of an end portion of the rotating shaft and the biasing member are inserted.

8. The switching valve according to claim 7, wherein a communication path is formed to axially communicate with at least one of the rotor, the rotating shaft, and the rotor casing.

9. The switching valve according to claim 1, wherein a communication path is formed to axially communicate with at least one of the rotor, the rotating shaft, and the rotor casing.

10. The switching valve according to claim 1, wherein the valve body has a sealing material that selectively surrounds at least two ports of the plurality of ports provided in the seating surface of the housing.

11. The switching valve according to claim 1, wherein the housing is provided with a space which accommodates the valve body and receives a fluid supplied from an introducing port included in the plurality of ports.

\* \* \* \* \*